United States Patent Office 3,300,380
Patented Jan. 24, 1967

3,300,380
DIMINISHING TOXICITY OF ANTIVIRAL N⁶-(HY-DROXYALKYL)ADENINES WITH 4-HYDROXY-PYRAZOLO(3,4-d)PYRIMIDINE
Jack E. Gray, Richland Township, Kalamazoo County, Gerald E. Underwood, Charleston Township, Kalamazoo County, and Kingsley M. Mann, Portage Township, Kalamazoo County, Mich., assignors to The Upjohn Company, Kalamazoo, Mich., a corporation of Delaware
No Drawing. Filed Dec. 26, 1963, Ser. No. 333,658
4 Claims. (Cl. 167—65)

This invention relates to antiviral compositions containing $N^6$-(hydroxyalkyl)adenines and 4-hydroxypyrazolo(3,4-d)pyrimidine and to a method for their use.

The primary ingredients employed in the novel compositions and method of this invention are (1) $N^6$-(hydroymethyl)adenine and $N^6$-(2-hydroxyethyl)adenine of the formula

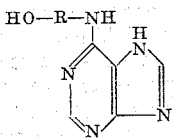

in which R is methylene or ethylene, and (2) 4-hydroxypyrazolo(3,4-d)pyrimidine of the formula

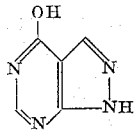

and the physiologically acceptable acid addition salts of $N^6$-(hydroxymethyl)adenine, $N^6$-(2-hydroxyethyl)adenine and 4-hydroxypyrazolo(3,4-d)pyrimidine, such as the hydrochlorides, sulfates, phosphates, citrates, succinates, maleates, tartrates and the like. Also specifically included are the tautomers and polymorphs of the compounds of Formulas I and II. The method hereof is practiced by administering to living subjects, substantially simultaneously, an $N^6$-(hydroxyalkyl)adenine and 4-hydroxypyrazolo(3,4-d)pyrimidine or their physiologically acceptable acid addition salts, all as defined above.

The $N^6$-(hydroxyalkyl)adenines can be prepared as described in U.S. Patent No. 2,844,577 and 4-hydroxypyrazolo(3,4-d)pyrimidine prepared as described by Robins, J. Am. Chem. Soc. 78:784 (1956).

The $N^6$-(hydroxyalkyl)adenines have been found effective in reducing virus titers in living subjects. For example, in mice infected with Coe virus the paralytic aspects of the disease have been notably modified, the number of deaths reduced and virus titers in certain organs and tissues significantly lowered by such antiviral treatment. Significant reduction in titers has also been shown against PR-8 virus. However, the usefulness of the $N^6$-(hydroxyalkyl)adenines is circumscribed by toxicity at the higher doses sometimes employed. Unexpectedly, combined therapy comprising $N^6$-(hydroxymethyl)adenine or $N^6$-(2-hydroxyethyl)adenine with 4-hydroxypyrazolo(3,4-d)pyrimidine has been found to provide unimpaired antiviral efficacy with significantly diminished toxicity.

Pharmaceutical compositions containing the presently described ingredients, based on activity demonstrated against representative viruses, alter favorably the course of viral diseases in mammals caused by respiratory viruses such as Coe virus. Benefits from treatment of mammals and birds derive from reduction of virus titers, interference with a secondary viral effect with consequent shortening of the illness, prevention of infection by a regimen of prophylactic medication, and interference with the metabolism of the host cell to decrease virus synthesis.

The principal ingredients are conveniently incorporated in animal and bird feed carriers of both the premix and readymix types. The former contain edible diluents such as starch, oatmeal, flour, licalcium phosphate, talc, dried fish meal, soybean meal and the like non-toxic orally acceptable diluents. The prepared premix is then conveniently added to the regular ration, thereby providing medication to the bird or animal in the course of its consumption of the said ration. The ready-mixed type is prepared by incorporating the principal ingredients directly into the ration for consumption without further dilution. The animal and bird feed preparations can be of both the solid and liquid types.

In addition to the $N^6$-(hydroxyalkyl)adenines and 4-hydroxypyrazolo(3,4-d)pyrimidine, other complementary ingredients can be included in the compositions to secure advantageous combinations of properties especially adapted to individual situations in the treatment of the foregoing conditions. In general, the amounts of such complementary ingredients employed in each unit dosage do not exceed the individual unit doses normally employed when such ingredients are administered alone. Thus, combinations of the primary active ingredients with analgesics such as aspirin (200–400 mg.), N-acetyl-p-aminophenol (200–400 mg.) and salicylamide (200–400 mg.); antihistamines such as chlorpheniramine maleate (2–4 mg., pyrathiazine hydrochloride (10–50 mg.), promethazine hydrochloride (5–30 mg.) and pyrilamine maleate (15–60 mg.); decongestants such as hydroxy-amphetamine hydrobromide (0.5–1%), phenylephrine hydrochloride (0.1–0.5%), phenylpropanolamine hydrochloride (0.5–1.5%); antibitoics such as penicillin (100,-000–1,000,000 U.), tetracycline (1–3% topically; 50–500 mg. systematically); neomycin (0.1–2%), bacitracin (200–500 U./cc.); other antivirals such as 1-β-D-arabinofuranosylcytosine (0.5–2.5% topically; 50–500 mg. systemically), N',N'-anhydro(bis)-β-hydroxyethylbiguanide hydrochloride (0.5–2.5%), and 5-iodo-2'-deoxyuridine (0.5–2.5%); and other coacting materials such as vitamin C (100–500 mg.) can be employed.

Suitable oral dosage forms include tablets, pills, capsules, granules, powders, oral solutions or suspensions and the like. For preparing solid compositions such as tablets, the active ingredient is admixed with conventional tableting ingredients or pharmaceutical carriers such as cornstarch, lactose, dicalcium phosphate, terra alba (calcium sulfate), talc, stearic acid, magnesium stearate, gums and functionally similar materials serving as lubricating agents, granulating agents, pharmaceutical diluents or carriers. The tablets or pills of these novel compositions can be laminated or otherwise compounded to provide a dosage form affording the advantages of prolonged, delayed or predetermined successive action of the enclosed medication. For example, the tablet or pill can comprise an inner dosage and an outer dosage component, the latter being in the form of an envelope enclosing the former. The two components can be separated by an enteric layer which serves to resist disintegration until the desired site of release is encountered. A variety of materials can be used for such enteric layers or coatings, these materials including a number of polymeric acids or mixtures of polymeric acids with, for example, shellac, shellac and cetyl alcohol, cellulose acetate phthalate, and the like. Advantageously, a coating consisting essentially or gelatin and styrene-maleic acid copolymer, deposited on the drub particles by a process of phase separation, such as by coacervation, can be employed as the encapsulating material capable of affording sustained release of the enclosed medication.

The oral liquid forms in which the novel compositions of this invention can be incorporated include aqueous solutions, flavored syrups, elixirs, suspensions, flavored emulsions with edible oils such as cottonseed oil, sesame oil, coconut oil, peanut oil and the like. Suitable dispersing or suspending agents for aqueous suspensions include synthetic and natural gums such as tragacanth, acacia, alginates, dextran, methyl-cellulose, polyvinylpyrrolidone, gelatin and the like. For veterinary use an aqueous suspension prepared as above and sterilized offers a convenient form for administration by injection.

Topical compositions incorporating the primary ingredients hereof are those prepared in such conventional pharmaceutical forms as eye, ear, throat and nasal sprays, drops, powders for inhalation and the like.

The term "unit dosage form" as applied to the compositions of this invention refers to physically discrete units suitable as unitary dosages, each unit containing a predetermined quantity of active material intended to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use, as disclosed in detail herein, these being features of the present invention. Examples of suitable unit dosage forms in accord with this invention are tablets, capsules, pills, powder packets, wafers, cachets, teaspoonfuls, tablespoonfuls, dropperfuls, segregated multiples of any of the foregoing, and other forms as hereinbefore described.

The following examples set forth the best mode contemplated for carrying out this invention but are not to be construed as limiting the scope thereof.

*Example 1*

Four groups of 20 mice each were infected intracerebrally with Coe Stock 8 virus (0.03 ml. of a 10% muscle suspension harvested from infected mice at the time they showed marked paralysis). Treatment was by the intraperitoneal route, starting one day before infection and continuing twice daily for five successive days. Compounds were prepared in aqueous 1% sodium carboxymethylcellulose solution. The first group received $N^6$-(2-hydroxyethyl)adenine only, 50 mg./kg. bodyweight per day. The second group received 4-hydroxypyrazolo-(3,4-d)pyrimidine only, 20 mg./kg. bodyweight per day. The third group comprised untreated control animals which were given comparable amounts of 1% sodium carboxymethylcellulose solution. Efficacy was determined by scoring the mice by reference to a graded scale ranging from apparent good health, through varying degrees of paralysis, to death. Each mouse was examined on the 6th and 10th day after inoculation. Grading was as follows: normal appearance, 10; slight paralysis, 7; paralyzed, 5; extreme paralysis, 2; dead, 0. For convenience, it was desired that a total score of 100 represent complete protection for each test group of 20 mice. Therefore, the score for a given group on a given day represented one-half the sum of the scores of the 20 individual mice in that group. This score was compared to the average obtained on the infected controls. Statistical analysis indicated that for significant activity, with 95% confidence limits, the score for the treated group should exceed the control score by 15 units on the 6th day reading or by 20 units on the 10th day reading.

Results were as follows:

| Treatment | Dose, mg./kg./day | 6-Day Score | Δ | 10-Day Score | Δ |
|---|---|---|---|---|---|
| Carboxymethylcellulose, 1% | | 32 | | 4 | |
| $N^6$-(2-hydroxyethyl)-adenine (A) | 50 | 59 | 27 | 31 | 27 |
| 4-hydroxypyrazolo(3,4-d)pyrimidine (B) | 20 | 35 | 3 | 5 | 1 |
| (A)+(B) | 50+20 | 46 | 14 | 36 | 32 |

Δ=Score of treated minus score of controls.

The foregoing results show $N^6$-(2-hydroxyethyl)adenine to be active, 4-hydroxypyrazolo(3,4-d)pyrimidine to be inactive, and the combination of the two to exhibit activity comparable to $N^6$-(2-hydroxyethyl)adenine alone.

In view of the apparent absence of effect of 4-hydroxypyrazolo(3,4-d)pyrimidine on the antiviral activity of $N^6$-(2-hydroxyethyl)adenine at non-toxic levels of the latter, it was then important to determine the effect of 4-hydroxypyrazolo(3,4-d)pyrimidine with higher doses of $N^6$-(2-hydroxyethyl)adenine.

*Example 2*

Groups comprising 10 mice each were infected as in Example 1 and treated twice daily for 5 days. $N^6$-(2-hydroxyethyl)adenine was injected at levels of 400, 200 and 100 mg./kg. bodyweight per day, 4-hydroxypyrazolo-(3,4-d)pyrimidine was given at a constant level of 20 mg./kg. bodyweight per day, and combinations of $N^6$-(2-hydroxyethyl)adenine and 4-hydroxypyrazolo(3,4-d)pyrimidine were administered daily as indicated. Deaths and average weights of survivors were recorded for each group on the 1st, 4th, 7th and 11th days. Results were as follows:

| Treatment* | Dose, mg./kg./day | Day 1 Wt. gm. | Day 1 Dead/Total | Day 4 Δ Wt. | Day 4 Dead/Total | Day 7 Δ Wt. | Day 7 Dead/Total | Day 11 Δ Wt. | Day 11 Dead/Total |
|---|---|---|---|---|---|---|---|---|---|
| A | 400 | 11.0 | 0/10 | −2.3 | 4/10 | ------ | 10/10 | ------ | ------ |
| A+B | 400+20 | 11.0 | 0/10 | −0.3 | 0/10 | +3.0 | 3/10 | +5.3 | 3/10 |
| A | 200 | 11.4 | 0/10 | −2.6 | 0/10 | −2.4 | 8/10 | +0.1 | 8/10 |
| A+B | 200+20 | 11.5 | 0/10 | +0.6 | 0/10 | +3.3 | 1/10 | +4.8 | 1/10 |
| A | 100 | 10.8 | 0/10 | −1.2 | 2/10 | −0.4 | 5/10 | −0.8 | 5/10 |
| A+B | 100+20 | 11.4 | 0/10 | +1.4 | 0/10 | +3.6 | 0/10 | +5.9 | 1/10 |

*A=$N^6$-(2-hydroxyethyl)adenine. B=4-hydroxypyrazolo(3,4-d)pyrimidine.

The foregoing results show that 4-hydroxypyrazolo-(3,4-d)pyrimidine, when administered in conjunction with $N^6$-(2-hydroxyethyl)adenine markedly decreases the toxic effects of the antiviral agent.

*Example 3.—Tablets*

One thousand tablets for oral use, each containing 250 mg. of $N^6$-(2-hydroxyethyl)adenine and 25 mg. of 4-hydroxypyrazolo(3,4-d)pyrimidine, are prepared from the following ingredients:

| | Gm. |
|---|---|
| $N^6$-(2-hydroxyethyl)adenine | 250 |
| 4-hydroxypyrazolo(3,4-d)pyrimidine | 25 |
| Starch, U.S.P. | 20 |
| Talc, U.S.P. | 15 |
| Calcium stearate | 2 |

The powdered primary ingredients are granulated with a 4% w./v. aqueous solution of methylcellulose, 1500 cps., U.S.P. To the dried granules is added a mixture of the remainder of the ingredients. The final mixture is compressed into tablets of proper weight.

*Example 4.—Hard gelatin capsules*

One thousand two-piece hard gelatin capsules for oral use, each containing 1000 mg. of $N^6$-(hydroxymethyl)adenine and 40 mg. of 4-hydroxypyrazolo(3,4-d)pyrimidine, are prepared from the following ingredients:

| | Gm. |
|---|---|
| $N^6$-(hydroxymethyl)adenine | 1000 |
| 4-hydroxypyrazolo(3,4-d)pyrimidine | 40 |
| Corn starch, U.S.P. | 1875 |
| Light mineral oil, U.S.P. | 130 |
| Magnesium stearate powder | 160 |
| Talc, U.S.P. | 160 |

The materials are mixed thoroughly and encapsulated.

*Example 5.—Soft elastic capsules*

One thousand soft-elastic capsules for oral use, each containing 50 mg. of $N^6$-(2-hydroxyethyl)adenine hydrochloride and 50 mg. of 4-hydroxypyrazolo(3,4-d)pyrimidine hydrochloride, are prepared by dispersing 50 gm. each of said ingredients in sufficient corn oil to render the drugs capsulatable and then encapsulating in the usual manner.

*Example 6.—Aqueous preparation*

Ten liters of aqueous preparation for oral use, containing in each tablespoonful (15 ml.) 1500 mg. of $N^6$-(hydroxymethyl)adenine hydrochloride and 500 mg. of 4-hydroxypyrazolo(3,4-d)pyrimidine hydrochloride, are prepared by thoroughly mixing together the following materials:

| | |
|---|---|
| $N^6$-(hydroxymethyl)adenine hydrochloride | gm_ 1000 |
| 4-hydroxypyrazolo(3,4-d)pyrimidine hydrochloride | gm_ 333 |
| Methylparaben | gm_ 7.5 |
| Propylparaben | gm_ 2.5 |
| Saccharin sodium | gm_ 12.5 |
| Cyclomate sodium | gm_ 2.5 |
| Glycerin | ml_ 3000 |
| Tragacanth powder | gm_ 10 |
| Orange oil flavor | gm_ 10 |
| F.D. and C. orange dye | gm_ 7.5 |
| Deionized water, q.s. | ml_ 10000 |

*Example 7.—Veterinary pre-mix*

Ten thousand grams of a pre-mix is prepared by thoroughly mixing 1000 gm. of $N^6$-(2-hydroxyethyl)adenine hydrochloride and 500 gm. of 4-hydroxypyrazolo(3,4-d)pyrimidine hydrochloride into 8500 gm. of soybean meal. Each gram of the pre-mix thus contains 100 mg. of the adenine and 50 mg. of the pyrazolopyrimidine. The pre-mix is added to the standard ration of cattle to provide a daily dose of 10 gm. of the adenine.

*Example 8.—Veterinary bolus*

Ten thousand boluses, each containing 5 gm. of $N^6$-(2-hydroxyethyl)adenine and 2.5 gm. of 4-hydroxypyrazolo(3,4-d)pyrimidine, are prepared from the following ingredients:

| | Gm. |
|---|---|
| $N^6$-(2-hydroxyethyl)adenine | 50,000 |
| 4-hydroxypyrazolo(3,4-d)pyrimidine | 25,000 |
| Lactose | 250,000 |

The ingredients are blended and granulated with syrup-starch paste, and q.s. mineral oil is added. The granulation is then dried, lubricated with starch, talc and calcium stearate powders, and compressed with a 1½″ x 11/16″ die.

*Example 9.—Injectable preparation*

A sterile aqueous preparation suitable for intramuscular injection and containing 250 mg. of $N^6$-(2-hydroxyethyl)adenine and 25 mg. of 4-hydroxypyrazolo(3,4-d)pyrimidine in each 2 ml. is prepared from the following ingredients:

| | |
|---|---|
| $N^6$-(2-hydroxyethyl)adenine | gm_ 125 |
| 4-hydroxypyrazolo(3,4-d)pyrimidine | gm_ 12.5 |
| Polyethylene glycol 4000, U.S.P. | gm_ 30 |
| Sodium chloride, U.S.P. | gm_ 9 |
| Preservative, q.s. | |
| Water for injection, q.s. | ml_ 1000 |

*Example 10*

For the principal ingredients of Examples 3 through 9 can be substituted the physiologically acceptable acid addition salts, such as the hydrochlorides, sulfates, phosphates, citrates, succinates, maleates, tartrates and the like.

What is claimed is:

1. A pharmaceutical preparation for reducing toxicity and maintaining antiviral action of a member selected from the group consisting of $N^6$-(hydroxymethyl)adenine, $N^6$-(2-hydroxyethyl)adenine and the physiologically acceptable acid addition salts thereof which comprises (1) an effective amount of said member for reducing virus titers and (2) a member selected from the group consisting of 4-hydroxypyrazolo-(3,4-d)pyrimidine and the physiologically acceptable acid addition salts thereof, wherein the ratio of the former member to the latter member is from about 2.5:1 to about 20:1.

2. A pharmaceutical preparation for reducing toxicity and maintaining antiviral action of a member selected from the group consisting of $N^6$-(hydroxymethyl)adenine, $N^6$-(2-hydroxyethyl)adenine and the physiologically acceptable acid addition salts thereof which comprises (1) an amount of said member to provide from about 50 mg./kg. to about 400 mg./kg. per day of said member and (2) a member selected from the group consisting of 4-hydroxypyrazolo-(3,4-d)pyrimidine and the physiologically acceptable acid addition salts thereof wherein the ratio of the former member to the latter member is from about 2.5:1 to about 20:1.

3. A method for reducing toxicity and maintaining antiviral action of a member selected from the group consisting of $N^6$-(hydroxymethyl)adenine, $N^6$-(2-hydroxyethyl)adenine and the physiologically acceptable acid addition salts thereof which comprises the parenteral administration of a pharmaceutical preparation according to claim 1.

4. A method for reducing toxicity and maintaining antiviral action of a member selected from the group consisting of $N^6$-(hydroxymethyl)adenine, $N^6$-(2-hydroxyethyl)adenine and the physiologically acceptable acid addition salts thereof which comprises the parenteral adminstration of a pharmaceutical preparation according to claim 2.

References Cited by the Examiner

UNITED STATES PATENTS 3,239,415  3/1966  Underwood _____ 167—53

FOREIGN PATENTS 798,646  7/1958  Great Britain.

OTHER REFERENCES

Bragonier et al.: Proc. Soc. Exp. Biol. Med. 116(3): 685 to 688, July 1964.

Elion et al.: Cancer Chemotherapy Rep. 16: 197 to 202, February 1962.

Elion et al.: Biochem. Pharmacol 12: 18–93, January 1963.

Elion et al.: Cancer Research 23: 1207 to 1217, September 1963.

Hitchings: Cancer Research 23: 1218 to 1225, September 1963.

(Other references on following page)

OTHER REFERENCES

Leiter et al.: Cancer Research 23(6): 1085–1093, 1095 to 1096, 1102, 1112 (entry 37153), July 1963.

Leiter et al.: Cancer Research 23 (No. 8, Part 2), pages 1483 to 1491, 1493 to 1494, 1498, 1636 (entry 41723), September 1963.

Pomales et al.: Biochem. Biophys. Acta 72(I): 119 to 120, May 28, 1963.

Stock et al.: Cancer Research 18 (No. 8, part 2), pages 49 to 53, 102: (entry 7515) September 1958.

LEWIS GOTTS, *Primary Examiner.*

SHEP K. ROSE, *Assistant Examiner.*